United States Patent [19]

Kerkman

[11] 4,379,568
[45] Apr. 12, 1983

[54] ARTICULATED TRACTOR LOADER WITH SIDE REAR VIEW MIRRORS

[75] Inventor: Thomas W. Kerkman, Salem, Wis.

[73] Assignee: Dresser Industries, Inc., Dallas, Tex.

[21] Appl. No.: 207,105

[22] Filed: Nov. 17, 1980

[51] Int. Cl.³ .............................................. B62D 63/04
[52] U.S. Cl. ................................. 280/400; 362/143
[58] Field of Search ...................... 280/400; 296/84 B; 350/307; 362/61, 80, 83, 135, 143

[56] References Cited

U.S. PATENT DOCUMENTS

| | | | |
|---|---|---|---|
| Re. 26,635 | 7/1969 | Kampert et al. ..................... | 414/700 |
| D. 115,802 | 7/1939 | Soderberg ......................... | D12/188 |
| D. 139,506 | 11/1944 | Golden ............................ | D12/188 |
| D. 168,065 | 10/1952 | Paine ............................. | D12/188 |
| D. 182,681 | 4/1958 | Morgenstern ...................... | D12/188 |
| D. 188,508 | 8/1960 | Morgenstern ...................... | D12/188 |
| D. 226,707 | 4/1973 | Skyer et al. ..................... | D14/3 A |
| 1,351,689 | 8/1920 | Rauscher ......................... | 362/80 |
| 1,515,005 | 11/1924 | Wolter ........................... | 362/143 |
| 1,874,027 | 8/1932 | Condon ........................... | 362/83 |
| 1,938,105 | 12/1933 | Johnson .......................... | 350/304 |
| 1,944,576 | 1/1934 | Roepke ........................... | 362/143 |
| 1,964,873 | 7/1934 | Dujardin ......................... | 362/83 |
| 2,281,102 | 4/1942 | Lowman ........................... | 350/302 |
| 2,302,952 | 11/1942 | Pfeifer .......................... | 350/304 |
| 2,796,003 | 6/1957 | Kaufman .......................... | 350/304 |
| 3,246,778 | 4/1966 | Kampert et al. ................... | 414/700 |
| 3,522,584 | 8/1970 | Talbot ........................... | 362/80 |
| 3,802,766 | 4/1974 | Magi ............................. | 350/307 |
| 3,961,808 | 6/1976 | Dotson ........................... | 280/153 R |

OTHER PUBLICATIONS

"Driver Visibility System for Large Mining Trucks", *Technology News,* Bureau of Mines, U.S. Dept. of Interior, Mar. 1979.

*Primary Examiner*—Joseph F. Peters, Jr.
*Assistant Examiner*—Ross Weaver
*Attorney, Agent, or Firm*—J. N. Hazelwood; B. E. Deutsch

[57] ABSTRACT

An articulated tractor loader vehicle which has side rear view convex mirrors mounted to the back of headlight housings for providing a panoramic rear view of the lateral sides of the tractor loader vehicle rearwardly of the front rubber tired wheels and rearwardly of the rear rubber tired wheels.

4 Claims, 6 Drawing Figures

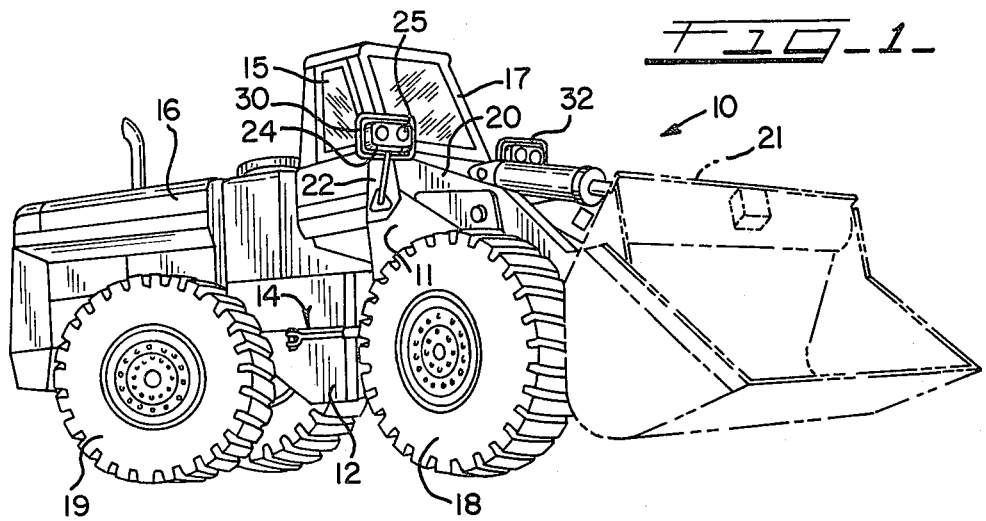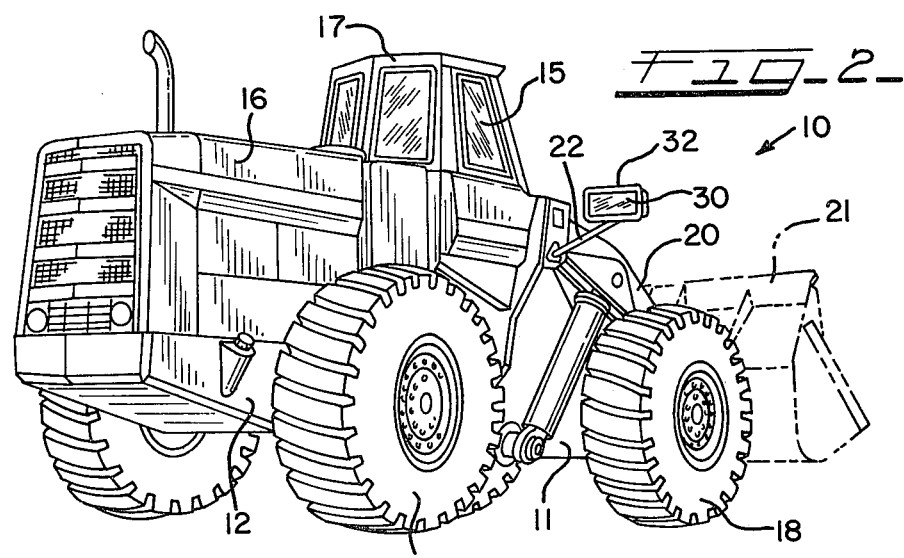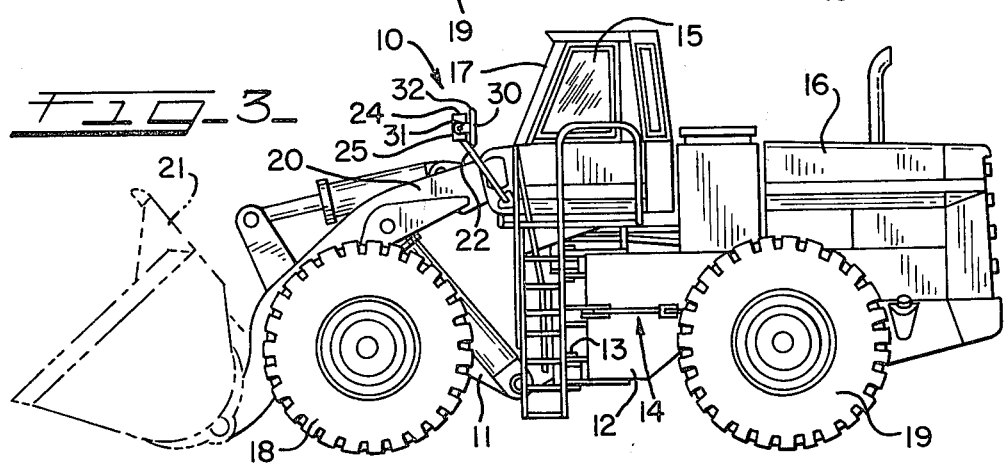

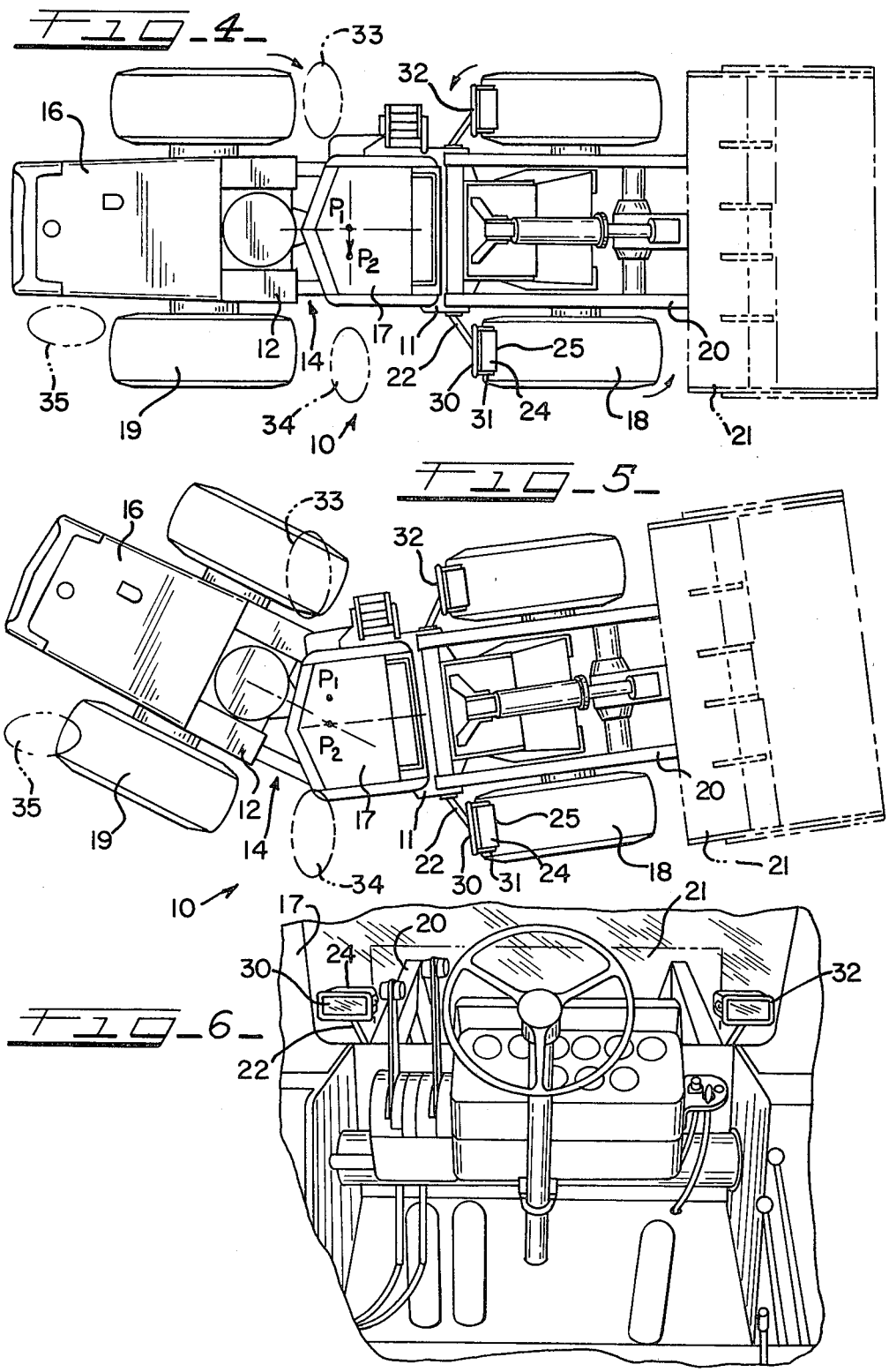

ARTICULATED TRACTOR LOADER WITH SIDE REAR VIEW MIRRORS

This invention relates to an articulated tractor loader vehicle, and more particularly to a combination headlight and side rear view convex mirror arrangement mounted to the front frame section of the tractor loader vehicle.

At the present, there are at least two types of conventional articulated tractor loaders. One type, such as shown in U.S. Pat. No. 3,961,808—Dotson—June 8, 1976, places a control compartment on the rear frame section, and the headlights on the front frame section. The disadvantage with this arrangement is that when the front and rear frame sections are articulated for turning the tractor loader, the operator in the control compartment, on the rear frame section, faces in a different direction from the headlights on the front frame section. This invention is adapted to the second and the preferred type of articulated tractor loader, such as shown in U.S. Pat. No. 3,246,778—Kampert et al—Apr. 19, 1966, No. Re. 26,635—Kampert et al—July 29, 1969, and No. Des. 226,707—Skyer et al—Apr. 17, 1973, wherein the operator's cab or compartment and the headlights are mounted on the front frame section, so that the operator turns with the front frame section and has complete visual command and maximum visibility of the side rear view convex mirrors mounted across the backs of the headlight housings.

Various examples of combination lights and mirrors are shown in the following U.S. Pat. Nos.:
(A) 1,351,689—Rauscher—Aug. 31, 1920
(B) 1,874,027—Condon—Aug. 30, 1932
(C) 1,938,105—Johnson—Dec. 5, 1933
(D) 1,964,873—Dujardin—July 3, 1934
(E) Des. 115,802—Soderberg—July 18, 1939
(F) 2,281,102—Lowman—April 28, 1942
(G) 2,302,952—Pfeifer—Nov. 24, 1942
(H) Des. 139,506—Golden—Nov. 21, 1944
(I) Des. 168,065—Paine—Oct. 28, 1952
(J) 2,796,003—Kaufman—June 18, 1957
(K) Des. 182,681—Morgenstern—Apr. 29, 1958
(L) Des. 188,508—Morgenstern—Aug. 2, 1960
(M) 3,522,584—Talbot—Aug. 4, 1970

All of the mirrors of the prior combinations are plane mirrors. One of the disadvantages with plane mirrors is that every point source of light from an extended object, such as a standing person, produces a plurality of corresponding virtual allochiral point images that lie equal distances directly behind the plane of the mirror. Thus, only a small patch of the plurality of virtual image points can be seen from any given eye position. The remainder of the plane mirror can be covered up or removed. In order for the eye to see another patch of the plurality of virtual image points, the eye must be moved to another viewing location. Another disadvantage with plane mirrors is that any vibrations transmitted from the operation of the tractor loader vehicle will shift the viewing location to another patch of the virtual image points. In my combination, the spherical or convex mirror has a radius of curvature of at least forty inches or approximately 1000 millimeters and is at least sixteen inches at 400 millimeters wide by twelve inches or 300 millimeters high. The large radius of curvature and size of the convex mirror provides a panoramic rear view of the lateral sides of the tractor loader rearwardly of the front tired wheels and rearwardly of the rear tired wheels. When a light from a point source falls on a convex mirror, a virtual allochiral point image is also produced, however, the virtual point image does not lie an equal distance directly behind the backside of the mirror. The virtual image is of a reduced size so that the eye can view many patches of virtual image points without moving to another viewing location. Thus, as the convex mirror vibrates, the viewed patch of virtual image points still appears substantially in the same viewing location.

The Bureau of Mines, U.S. Department of the Interior, reports on the use of rectangular shaped convex mirrors on large mining trucks in their publication "Technology News", No. 64, March 1979. The rectangular shaped convex mirrors are oriented with the wide sides extending vertically and are mounted on non-articulated large mining trucks, whereas in my invention, the rectangular shaped convex mirrors have the wide sides extending horizontally or laterally outwardly from the sides of the front frame section of an articulated tractor loader, which provides for a wider horizontal field of vision, and the convex mirrors are mounted on the backs of headlight housings mounted to the front frame section.

In the aforementioned preferred type of articulated tractor loader, the front frame section, which supports the operator's cab, lacks side view mirrors which enable an operator seated in the cab to inspect the vicinity below the cab rearwardly of the front rubber tired wheels at the hinge connection of the front and rear sections, and the area rearwardly of the rear rubber tired wheels to see that there are no obstructions or persons in the lateral shifting path of the hinge connection and the turning path of the rear rubber tired wheels either before articulating or turning the front and rear frame sections or before straightening previously articulated or turned front and rear frame sections.

According to my invention, right and left side rear view convex mirrors are provided on the front frame section for viewing the vicinity below the cab rearwardly of the front rubber tired wheels at the hinge connection and the area rearwardly of the rear rubber tired wheels, to make sure that there are no obstructions or persons in the way of the lateral shifting hinge connection and turning rear rubber tired wheels. As mentioned previously, the convex side rear view mirrors are at least 16 inches or 400 millimeters wide by 12 inches or 300 millimeters high and have a radius of curvature of at least 40 inches or 1000 millimeters and are oriented so that the wide sides extend laterally or horizontally. Due to the enormity and orientation of the convex mirrors, it is not practical to mount the convex mirrors to the right and left sides of the operator's cab, as is the case in some prior mirror mountings where the narrow sides extend laterally or horizontally, because in my combination the laterally extending wide sides of side rear view convex mirrors would interfere with entry to and egress from the operator's cab. My solution to the problem is to mount the convex mirrors to an existing structure on the front frame section which does not interfere with the operator and the operation of the articulated tractor loader. One such existing structure is the right and left side headlight housings which are mounted on the front frame section. The right and left side headlight housings heretofore served only one useful purpose and that was to house the headlights therein and were blind spots when viewed forwardly and downwardly from the operator's cab. Now the headlight housings serve a second useful purpose by providing supporting and mounting means for the enormous side rear view convex mirrors. Each headlight housing is supported on a forwardly and laterally outwardly extending beam, strut or standard, which is mounted below the pivotal axis of the boom arms. The headlight housings may be square or rectangular in shape, depending on the number of headlights housed therein, and are normally spaced above and laterally outwardly of the boom arms in the lowered position of the boom arms, so that the side rear view convex mirrors, which are universally mounted across the backs of the headlight housings, have an unobstructed view of the lateral sides of the tractor loader rearwardly of the front rubber tired wheels, the hinged front and rear frame section connections and the area rearwardly of the rear rubber tired wheels. Each of the side rear view convex mirrors is imbedded in a band of elastomeric material which acts to shield and protect the convex surface of the mirror. A pair of arms extend from the narrow sides of each convex mirror and are used to universally mount the oblong convex mirrors across the backs of the right and left headlight housings. Since the mirrors are universally mounted, they can be adjusted by the operator to suit his individual rear visual needs. Once adjusted, the mirror mounting arms are locked to the sides of the headlight housings by any suitable hardware means adapted for this purpose.

Thus, it is a prime object of the invention to provide right and left side rear view convex mirrors across the backs of existing headlight housings carried on the front frame section of an articulated tractor loader vehicle which affords the operator a panoramic view of the midsection and rear of the vehicle.

The various figures in the accompanying drawing illustrate a suitable arrangement for a constructive practice of my invention, wherein:

FIG. 1 is an isometric partial front and right side view of a tractor loader vehicle in an articulated condition for turning, having a pair of right and left side headlights mounted on the front frame section;

FIG. 2 is an isometric partial rear and right side view of the tractor loader of FIG. 1, in a non-articulated condition for straight-ahead driving, with a side rear view convex mirror shown mounted across the back of the right headlight housing;

FIG. 3 is a left side view of the tractor loader, in the non-articulated condition, showing the access system to the operator's cab and the profile of the side rear view convex mirror mounted across the back of the left headlight housing;

FIG. 4 is a top view of the tractor loader prior to articulation of the front and rear frame sections from a stand-still position, with obstructions represented by dash-dot line ovals;

FIG. 5 is a top view of the FIG. 4 tractor loader after articulation showing the lateral shifted position of the hinged connection and the turned front and rear rubber tired wheels with respect to the dash-dot line oval obstructions; and FIG. 6 is a view through the windshield of the cab showing the right and left side rear view convex mirrors mounted across the backs of the headlight housings.

With reference to the various figures of the accompanying drawing, wherein similar numerals refer to similar parts in the several views, the articulated tractor loader 10, is of the preferred type, such as shown in the aforementioned U.S. Pat. No. 3,246,778, No. Re. 26,635 and No. De. 226,707, which are incorporated herein by reference thereto, wherein the operator's cab 17 and the pair of right and left headlights 25 are mounted on the front frame section 11, so that the operator turns with the front frame section 11 and has complete visual command and maximum visibility of the side rear view convex mirrors 30 mounted across the backs of the right and left headlight housings 24. Reference may be made to U.S. Pat. No. 3,246,778 and No. Re. 26,635 for a more detailed description of the operation of the articulated tractor loader 10.

The front frame section 11 is pivotally connected to the rear frame section 12, which carries the power plant 16, by vertical hinge pins 13. Hydraulic power actuated link means 14 control the articulation of the forward operator's control section 11 and the rearward power plant section 12, and front and rear pairs of rubber tired wheels 18 and 19 support the articulated front and rear frame sections 11 and 12. As shown in FIG. 4 due to the enormous height of the tractor loader 10, the obstructions 33 and 34 at the lateral sides of the tractor loader, in the vicinity of the hinged pivot connection 13, and the obstruction 35 to the rear of the right rear rubber tired wheel 19 are not visible from the operator's compartment 17, unless the operator physically sticks his head out of the side windows 15 of the cab 17 and observes if there are any obstructions present in the lateral shifting path of the hinged connection 13 and the turning rolling path of the rear rubber tired wheels 19 as shown in FIG. 5. As shown in FIG. 6, the operator can observe from within the operator's cab 17 by means of the side rear view convex mirrors 30 mounted to the right and left headlight housings 24, whether there are any obstructions such as 33, 34, and 35 before initiating a turn or straightening of the front and rear frame sections 11 and 12.

A pair of right and left boom arms 20 are pivotally mounted at the inboard end to the sides of the front frame section 11 and carry a material handling implement 21 at the swingable outboard end. The right and left headlight housings 24 are connected to the upper ends of forwardly upwardly and laterally outwardly projecting supporting standards 22, which may be rigid rods or bars, which have the lower ends fixed to the sides of the front frame section in the vicinity below the pivotal connection of the boom arms 20 thereto.

The shape of the headlight housings 24 depends on the number of headlights 25 housed and their placement therein. In my arrangement there are two side-by-side headlights 25 housed in each housing 25. In order to provide room for the side-by-side headlights 25, the headlight housings 25 are oblong or rectangularly shaped. A pair of right and left side rear view convex mirrors 30 are mounted across the backs of the headlight housings 24. Each mirror has a pair of forwardly projecting bracket arms 31, which embrace the lateral vertical shorter sides of the oblong headlight housings 24, and are universally mounted thereto. Once the convex mirrors are adjusted to suit the operator's rearward visual needs, the bracket arms 31 are then locked in place to the sides of the headlight housings by any suitable hardware means provided for this purpose.

The side rear view convex mirrors are at an elevation above the front pair of rubber tired wheels 18 and on a vertical plane passing through a rearward segment of the front wheels 18, so that the hinged connection of the front and rear frame section 11 and 12, the rear pair of rubber tired wheels 19, and the area rearwardly thereof, can all be observed in the convex mirrors 30 from the operator's compartment 17 as shown in FIG. 6.

A ribbon or band 32 of an elastomeric material encircles each convex mirror 30 and provides a protective shield or bumper for the convex surface of the mirrors, as well as provides a cushion against vibrations and shocks.

What is claimed is:

1. In an articulated tractor loader comprising a front frame section supported on front rubber tired wheels and supporting an operator's cab, a rear frame section hingedly connected to the front frame section and supported on rear rubber tired wheels and supporting a power plant, said front wheels and said rear wheels being disposed outboard of their respective frame sections, a pair of right and left boom arms mounted on transverse pivots on opposite sides of the front frame section forwardly of the operator's cab, a pair of right and left support standards fixedly mounted to the sides of the front frame section and supporting a pair of right and left headlight housings forwardly of the cab and above the boom arm pivots outboard of the front frame section, and a pair of right and left side rear view convex mirrors mounted to the headlight housings providing a panoramic rearward and downward view looking from the operator's cab, said view including at least the sides of the tractor loader vehicle rearwardly of the front wheels, the ground area between said front and rear wheels, and a ground area rearwardly of the rear wheels.

2. The invention in accordance with claim 1 and the headlight housings having an open back wherein the convex mirrors extend across and cover the back, are oblong in shape and are oriented with the longer sides extending laterally with respect to the sides of the front frame section.

3. An articulated tractor loader vehicle according to claim 1 wherein the convex mirrors have a radius of curvature of at least forty inches or 1000 millimeters and are at least sixteen inches or 400 millimeters wide by twelve inches or 300 millimeters high and have a band of protective elastomeric material encircling their periphery.

4. An articulated tractor loader vehicle according to claims 3 or 1, wherein the convex mirrors are located on the backs of the headlight housings at an elevation above the front rubber tired wheels and on a vertical plane passing through a rearward segment of the front wheels.

* * * * *